Jan. 6, 1942. E. H. RUGG 2,269,228
FIXTURE STUD FOR OUTLET BOXES
Filed Aug. 27, 1940

Inventor:
Edward H. Rugg,
by Harry E. Dunham
His Attorney.

Patented Jan. 6, 1942

2,269,228

UNITED STATES PATENT OFFICE 2,269,228

FIXTURE STUD FOR OUTLET BOXES

Edward H. Rugg, Bridgeport, Conn., assignor to General Electric Company, a corporation of New York Application August 27, 1940, Serial No. 354,370

5 Claims. (Cl. 248—298)

My invention relates to a box supporting device, and more particularly to a fixture stud assembly for mounting an electrical outlet box on an associated support, such as a bar hanger, for use in house wiring systems.

In residence wiring systems it is customary to mount outlet boxes in position by means of a bar hanger fastened to the framing of the house. In such cases a stud assembly is usually employed. This stud assembly accomplishes two purposes; first, the stud is supported on the bar hanger by a portion of the assembly which projects beyond the confines of the box; second, the outlet box is supported by a portion of the assembly which extends within the interior of the box. It is important that the outlet box be slidably mounted on the bar hanger to permit adjustment or centering of the outlet box in any particular installation. To accomplish this result the mounting stud is usually movable along the bar hanger and is secured in any chosen position by means of a lock screw inserted through the stud and engaging the bar hanger. Then the outlet box, in turn, is mounted on the stud by a separate means which usually consists of a nut threaded around the shank of the stud assembly within the outlet box. When this construction is employed two separate adjustments are necessary to position the stud directly on the bar hanger and to hold the outlet box in position on the stud. However, my invention contemplates the provision of only a single locking means to accomplish both purposes, that is, to mount the stud in position on the bar hanger and to retain the outlet box in position on the stud.

It is an object of my invention to provide an improved and simplified form of stud assembly for adjustably securing an outlet box to a bar hanger in which a single adjustment is employed to accomplish the aforementioned two purposes of mounting the stud in position on the bar hanger and securing the outlet box in position on the stud.

Another object of my invention is the provision of a new and improved box supporting device which comprises relatively few parts such that it may be manufactured at low cost and which may be quickly and easily installed in position.

Figure 1:
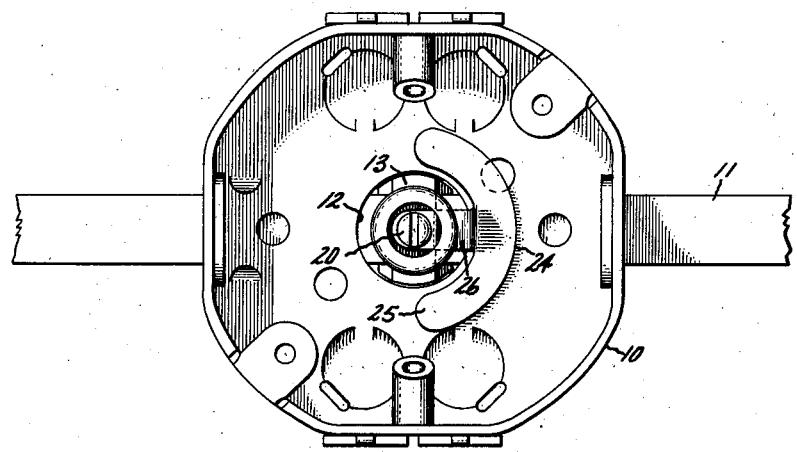
Figure 2:
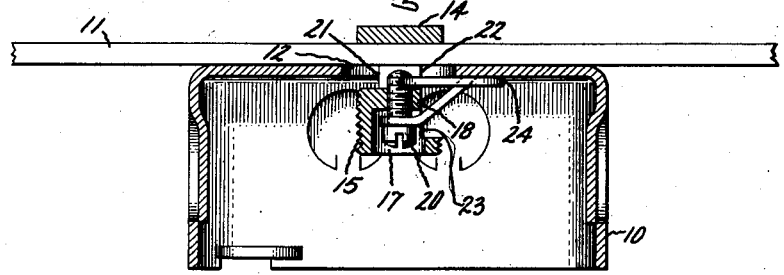

In the accompanying drawing Fig. 1 is a plan view of the interior of an outlet box showing my box supporting device in position; Fig. 2 is a sectional view through an outlet box and the box supporting device showing these elements in position on a bar hanger, and Fig. 3 is an exploded view of the elements of my supporting device.

Referring to the drawing I have shown my box supporting device mounting an outlet box 10 on a supporting strap 11 such as a bar hanger. The outlet box is provided with a centrally disposed opening 12 in the bottom wall of the box through which the box supporting device extends for securing the outlet box in position on the hanger. In some cases the opening 12 may be formed by permanently punching out the bottom of the box, whereas in other cases it may be formed by a knockout.

Figure 3:
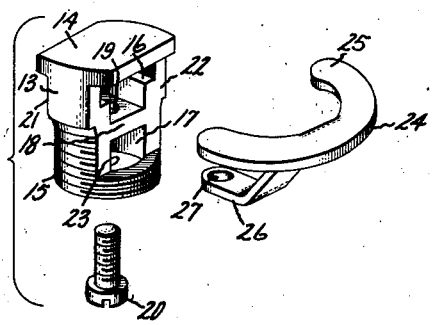

Referring more particularly to Fig. 3, my box supporting device comprises a stud 13 having a head portion 14 at one end and a threaded shank 15 at the other. The head portion of the stud is of a size and configuration to extend through the opening 12 in the bottom of the outlet box. In order to receive the bar hanger 11, the head portion is provided with a recess 16 which is of a configuration corresponding to that of the bar hanger. In the form illustrated by the drawing the bar hanger is of a rectangular shape and the recess 16 is correspondingly formed but, manifestly, the bar hanger may be given other shapes depending upon the particular installation with which it is to be used. The threaded portion of the stud is provided with a hollowed out or well portion 17 which is separated from the recess 16 by a web 18. The web 18 is provided with a tapped opening 19 for receiving a locking screw 20. In mounted position the shank of the screw extends partially into the recess 16, while the headed end of the screw is retained within the well 17, so that it is out of the way of the electrical wiring within the box yet is easily accessible for adjustment by a screw driver. Opposite sides of the fixture stud are provided with chamfered or flat surfaces, which expose the recess 16 for easy insertion of the bar hanger. The flat surface 21 on one side of the fixture stud extends from a point adjacent the top of the head portion 14 to a point adjacent that at which the threads are applied to the shank of the stud. The other flat face 22 extends downwardly below the point at which the threads are formed on the shank of the stud to a point spaced from the end of the shank. Inasmuch as the flat face 22 stops short of the end of the shank, a portion of the complete screw threads are available for mounting an electric lighting fixture, or the like, on the shank of the stud. This is of importance since if the flat surface 22 extended to the edge of the shank the continuity of the threads would be broken, making it difficult to thread the nipple of the lighting fixture on the stud.

The enlarged flat surface 22 exposes the well 17 to the side of the stud through an opening 23 to provide for mounting of a clamping member 24 in a manner now to be described.

The clamping member 24 comprises a curved or horseshoe-shaped bearing portion 25 provided with an extending tongue portion 26 which extends below the plane of the bearing surface 25 and which is adapted to extend through the opening 23 in the fixture stud into the interior of the well 17. The portion of the tongue extending within the well is provided with an opening 27 for receiving the locking screw 20. The clamping member stud and screw 20 are assembled together as a unit as shown in Fig. 2. The curvature of the bearing surface 25 is such that it surrounds the opening 12 in the bottom of the outlet box. At the same time the area of this surface is sufficient to insure adequate clamping action against the bottom wall of the outlet box.

To mount the outlet box on the bar hanger the head of the stud is inserted through the opening 12 and thereafter the bar hanger is slipped through the recess 16. This leaves the bearing member 24 on the interior of the outlet box and in engagement with the bottom wall of the box. Thereafter the screw 20 is tightened. Inasmuch as the bearing member is in engagement with the wall of the box, tightening of the screw 20 draws down the fixture stud and the bar hanger into engagement with the outer wall of the outlet box. This means that the wall of the outlet box is securely clamped between the bar hanger 11 and the bearing member 24. At the same time the head of the stud is held firmly in position on the bar hanger and cannot be moved transversely thereof.

In case the fixture stud and the bearing member are originally disassembled, the stud may be mounted on the outlet box and the bar hanger by an alternative method. The stud is first mounted on the bar hanger 11 by inserting the hanger through the recess 16, and then the threaded portion of the stud is inserted through the opening 12 in the wall of the outlet box into the interior thereof. Thereafter, the tongue of the clamping member is slipped into the well 17 and the locking screw placed in position and tightened to bring the clamping member into engagement with the wall of the outlet box.

My invention greatly simplifies the manner of mounting the outlet box and adjusting the stud on the hanger due to the fact that but a single tool, such as a screwdriver, is needed to accomplish both of these operations. In former constructions it was necessary to provide a locking nut on the threaded shank to hold the outlet box on the stud in addition to a central locking screw to hold the stud in position on the hanger. By my construction, however, a single locking screw performs both of these functions. The tongue 26 extends downwardly at an angle from the bearing surface 25 to the interior of the well 17, so that as the screw 20 is tightened up sufficient force is transmitted to the wall of the outlet box to hold the assembly rigidly in position. The tongue 26 is made amply strong to prevent bending. Even though the bearing member 24 engages the wall of the outlet box on a side of the fixture stud, it has been found that the stud is not tipped out of the vertical position due to the fact that the clamping action of the plate brings the bar hanger tightly into position with the outer wall of the outlet box thereby maintaining the fixture stud in vertical position. Since the flat face 22 on the side of the fixture stud is spaced from the end of the stud, several complete threads are provided adjacent the end of the stud for easy threading of a mounting hickey of an associated lighting fixture. This is accomplished simply by threading the hickey onto the shank 15; inasmuch as the tongue 26 extends upwardly at an angle from the point at which it enters the well 17 an ample number of threads are available for securely fastening the hickey in position. The bearing member 24 may be formed of punched sheet metal so that it lies close to the bottom wall of the box and takes up a minimum of room within the box. This greatly increases the space available for wiring. Inasmuch as all adjustments of the box and stud are performed by means of a screwdriver operating on the locking screw 20, it is easy to make such adjustments when the box is filled with wiring assembly simply by inserting a screwdriver into the interior of the box and engaging the locking screw 20. It is unnecessary to remove any part of the wiring assembly.

What I claim as new and desire to secure by Letters Patent of the United States is:

1. A support for mounting an outlet box having an opening in the bottom wall thereof on a bar hanger comprising, in combination, a stud having a portion on the exterior of the box adapted to grip the bar hanger, and a threaded portion within the interior of the box adapted to cooperate with an electric fixture or the like, a locking screw, the threaded portion of the stud being hollowed out to receive said locking screw, and a clamping member cooperating with said stud and being located within the interior of the outlet box and engaging the wall thereof, said clamping member having a tongue extending within the hollow portion of said stud and cooperating with said locking screw to lock the outlet box and stud in position on said hanger on tightening of said screw.

2. A mounting assembly for supporting an outlet box having an opening in a wall thereof on a bar hanger comprising, in combination, a stud member located in said opening and having a portion extending on the exterior of said box provided with a recess for receiving the bar hanger, said stud being provided with a threaded extension located within the interior of the box and having a hollow portion provided with an opening extending through the side of the stud, a locking screw threaded in said stud within the hollow portion and a clamping member cooperating with said stud and adapted to engage the wall on the interior of the outlet box, said clamping member being provided with a projecting portion extending through the opening in the stud into the hollow portion and cooperating with said locking screw to clamp the wall of the outlet box between the bar hanger and the clamping member upon tightening of said screw.

3. A mounting device comprising a stud provided with a head portion and threaded shank portion, the head portion being provided with a recess for receiving a bar hanger, the shank portion being provided with a hollowed-out portion separated from said recess by a web, a locking screw threaded into said web, a portion of the wall of said shank portion being broken away to expose the interior of the hollowed-out portion to the side of the stud, a clamping member having a tongue extending into the interior of the hollowed-out portion through the exposed side thereof and cooperating with said locking screw, said stud being adapted for insertion through an opening in the wall of an outlet box with a bar hanger extending through said recess on the exterior of said wall and the clamping member being located within the box and engaging the interior wall of said outlet box, whereby the wall of the box is clamped between a bar hanger and the clamping member upon tightening of said locking screw.

4. An assembly for mounting an outlet box on a bar hanger comprising, in combination, a stud extending through an opening in the wall of the box and having a portion on the exterior of the wall provided with a recess for receiving a bar hanger, another portion of the stud extending within the outlet box and provided with a threaded shank, the shank portion being provided with a well having a side opening exposing the interior of the well, a locking screw mounted on said shank portion within said well and a clamping member having a curved bearing surface extending around a portion of the perimeter of the opening in the wall of the outlet box and bearing against the wall of the box, said clamping member being provided with a tongue portion extending through said side opening into the interior of the well and cooperating with said locking screw, the wall of outlet box being clamped between the bar hanger and the clamping member upon tightening of said locking screw.

5. A mounting assembly for an outlet box having an opening in a wall thereof comprising, in combination, a stud member located in said opening and having a portion on the exterior of the outlet box provided with a recess for receiving a bar hanger therethrough, another portion of said stud extending into the interior of said outlet box, and being provided with a threaded extension, said threaded extension being provided with a hollowed-out portion separated from said recess by a web, a locking screw threaded into said web and being enclosed by said threaded extension within the hollowed-out portion, a clamping member having a curved bearing surface extending around a portion of the periphery of the opening in the wall of the outlet box and engaging the wall of the outlet box, said clamping member having a tongue portion extending into said hollowed-out portion and cooperating with said locking screw, the wall of the outlet box being clamped between the bar hanger and the bearing surface of said clamping member upon tightening of said locking screw.

EDWARD H. RUGG.